US007477826B2

(12) United States Patent
Mullaney et al.

(10) Patent No.: US 7,477,826 B2
(45) Date of Patent: Jan. 13, 2009

(54) CABLE ENCLOSURE ASSEMBLIES AND METHODS FOR USING THE SAME

(75) Inventors: Julian Mullaney, Raleigh, NC (US); James Bert Powell, Garner, NC (US); William Alan Carrico, Raleigh, NC (US); Christopher Alan Hastings, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/978,780

(22) Filed: Oct. 30, 2007

(65) Prior Publication Data
US 2008/0169116 A1    Jul. 17, 2008

Related U.S. Application Data

(60) Provisional application No. 60/885,081, filed on Jan. 16, 2007.

(51) Int. Cl.
*G02B 6/00*    (2006.01)
(52) U.S. Cl. .................. 385/134; 385/135; 385/147
(58) Field of Classification Search ............ 385/51, 385/134–139, 147
See application file for complete search history.

(56) References Cited

U.S. PATENT DOCUMENTS 5,347,084 A    9/1994    Roney et al.
5,674,089 A    10/1997    Sampson
5,763,835 A    6/1998    Huynh-Ba
6,303,865 B1 *    10/2001    Yamamoto et al. ......... 174/72 A
6,333,463 B1    12/2001    Bukovnik et al.

OTHER PUBLICATIONS

Tyco Electronics Corporation, FOSC 450, Fiber Optic Gel Splice Closures, 2001, 2 pages.
Tyco Electronics Corporation, FOSC 450, Fiber Optic Splice Closure Ordering Guide, 2004, 26 pages.
Tyco Electronics Corporation, FOSC 450 D Closure Installation Instruction: Fiber Optic Splice Closure, 2003, 26 pages.

* cited by examiner

*Primary Examiner*—Kevin S Wood
(74) *Attorney, Agent, or Firm*—Myers Bigel Sibley & Sajovec, PA

(57) ABSTRACT

According to embodiments of the present invention, a cable sealing assembly for providing an environmental seal about a cable includes a housing, a flowable cable sealant and a compression feature. The housing includes first and second housing parts. The first housing part defines a cable passage to receive a cable having a lengthwise cable axis. The cable sealant is disposed in the cable passage. The compression feature forms at least a part of the second housing part and is movable in an installation direction between a ready position and an installed position. The compression feature is shaped and configured to force the cable sealant to flow about the cable in a direction transverse to the cable axis to circumferentially surround a portion of the cable when the compression feature is moved from the ready position to the installed position.

27 Claims, 8 Drawing Sheets

CABLE ENCLOSURE ASSEMBLIES AND METHODS FOR USING THE SAME

RELATED APPLICATION(S)

The present application claims the benefit of U.S. Provisional Patent Application No. 60/885,081, filed Jan. 16, 2007, the disclosure of which is hereby incorporated herein by reference in its entirety.

FIELD OF THE INVENTION

The present invention relates to cable enclosures and, more particularly, to cable enclosure assemblies and methods for using the same.

BACKGROUND OF THE INVENTION

It is often necessary or desirable to enclose cable terminations or splices in environmentally sealed enclosures. For example, an operator may wish to enclose an optical fiber cable splice or termination. Some fiber optic cables, commonly referred to as "flat drop cables", are frequently used for fiber-to-the-home connections and may require splice enclosures. Fiber optic drop cables typically include one or more strength members, one or more optical fibers, a protective buffer tube surrounding the optical fiber(s), and an outer jacket surrounding the strength member(s) and the buffer tube. Known environmental splice enclosures typically secure each cable using clamps, bolts or the like to prevent the cable from pulling out or pushing into the enclosure.

SUMMARY OF THE INVENTION

According to embodiments of the present invention, a cable sealing assembly for providing an environmental seal about a cable includes a housing, a flowable cable sealant and a compression feature. The housing includes first and second housing parts. The first housing part defines a cable passage to receive a cable having a lengthwise cable axis. The cable sealant is disposed in the cable passage. The compression feature forms at least a part of the second housing part and is movable in an installation direction between a ready position and an installed position. The compression feature is shaped and configured to force the cable sealant to flow about the cable in a direction transverse to the cable axis to circumferentially surround a portion of the cable when the compression feature is moved from the ready position to the installed position.

According to method embodiments of the present invention, a method for providing an environmental seal about a cable having a lengthwise cable axis using a cable sealing assembly, the cable sealing assembly including first and second housing parts, includes: installing the cable in a cable passage defined in the first housing part; and thereafter moving a compression feature forming at least a part of the second housing part in an installation direction between a ready position and an installed position such that the compression feature forces a flowable cable sealant disposed in the cable passage to flow about the cable in a direction transverse to the cable axis to circumferentially surround a portion of the cable.

According to embodiments of the present invention, a cable sealing assembly for providing an environmental seal about a cable includes a housing assembly and a flowable cable sealant. The housing assembly defines a cable passage to receive a cable having a lengthwise cable axis. The flowable cable sealant is disposed in the cable passage. The housing assembly includes a compression feature and a triple point filler feature. The compression feature is movable between a ready position and an installed position to flowably displace the cable sealant about the cable. The triple point filler feature is configured to occupy a triple point void channel formed in the cable sealant by movement of the compression feature from the ready position to the installed position.

According to method embodiments of the present invention, a method for providing an environmental seal about a cable having a lengthwise cable axis using a cable sealing assembly includes installing the cable in a cable passage defined in the cable sealing assembly, the cable passage having a flowable cable sealant disposed therein; and thereafter moving a compression feature from a ready position to an installed position to flowably displace the cable sealant about the cable and position a triple point filler feature in a triple point void channel formed thereby in the cable sealant.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
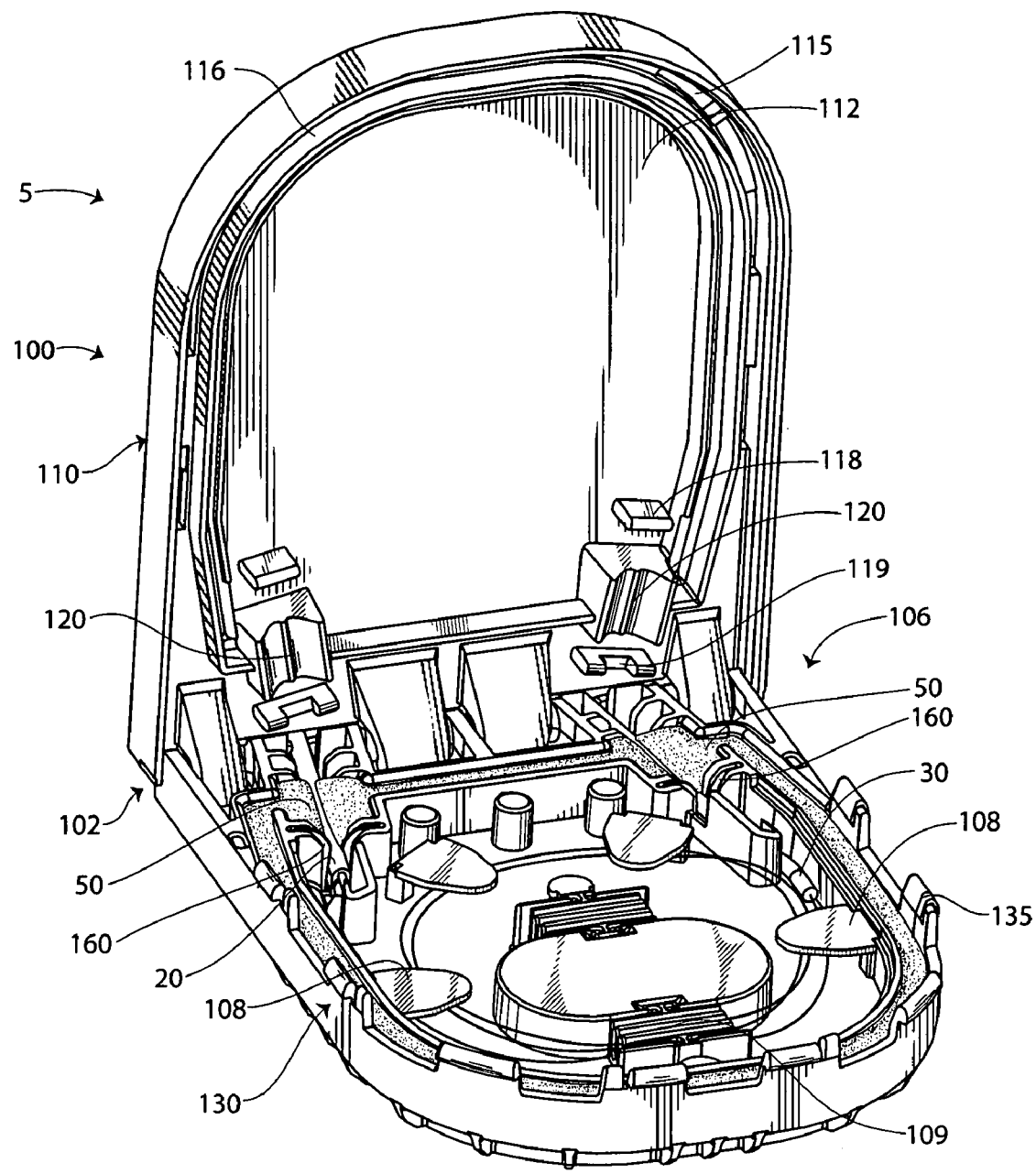
FIG. 1 is a rear perspective view of a splice connection assembly including a cable enclosure assembly according to embodiments of the present invention, wherein the cable enclosure assembly is in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention provide cable enclosure assemblies for securing and/or environmentally protecting cable terminations or splices. More particularly, according to some embodiments, a cable enclosure assembly includes a cable sealant and a mechanism to displace the cable sealant about a circumference of the cable to effect improved or complete coverage of the sealant about the cable. According to some embodiments, a mechanism is provided to close or fill a sealant triple point void to prevent the formation of an unsealed passageway. Still further embodiments provide mechanisms for resisting pull out of the cable from the enclosure and/or for resisting push in or intrusion of the cable into the enclosure without requiring the use of bolts, clamps, or the like.

Figure 2:
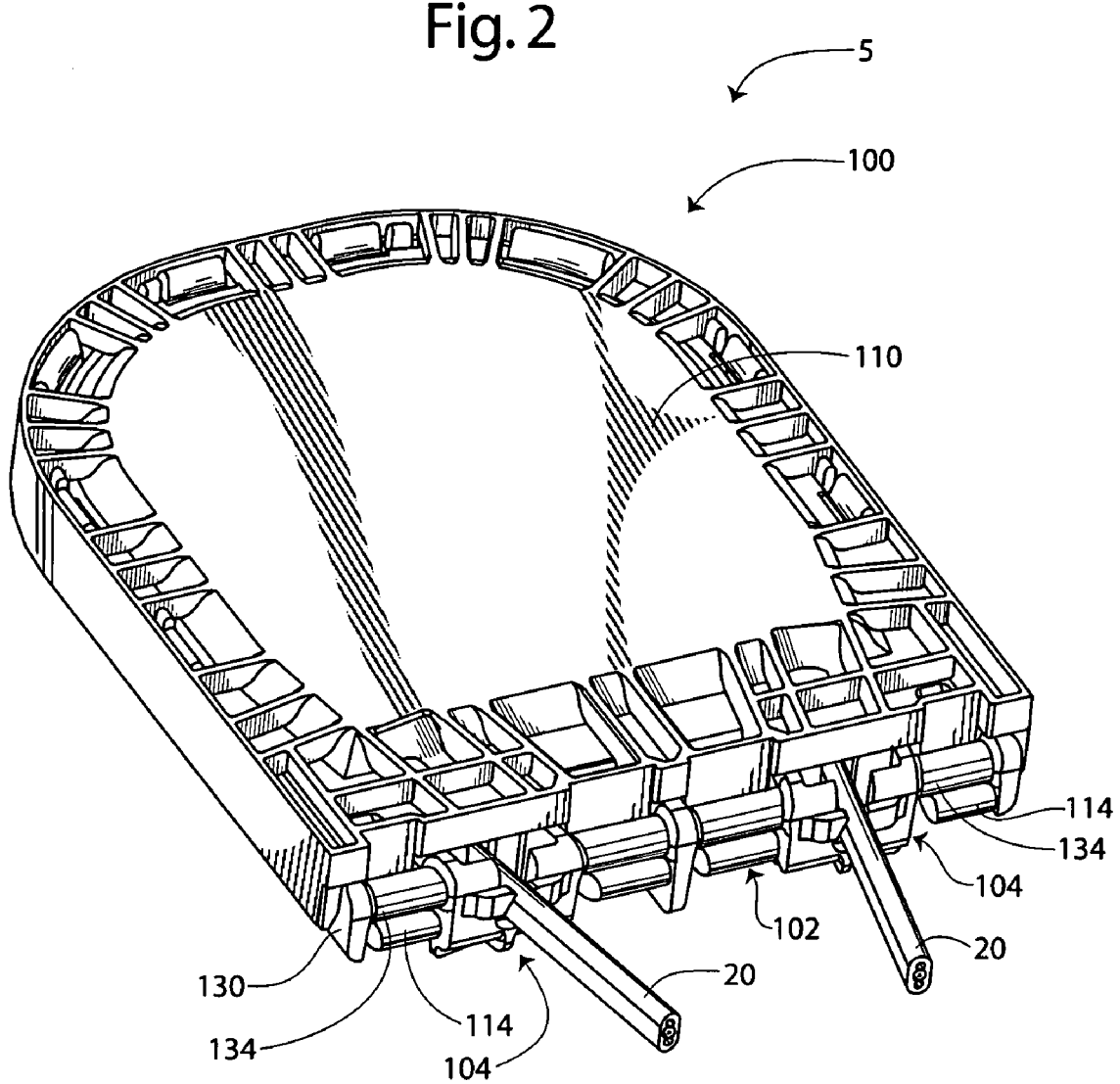
FIG. 2 is a front perspective view of the splice connection assembly of FIG. 1, wherein the cable enclosure assembly is in a closed position.

With reference to FIGS. 1 and 2, a cable enclosure assembly 100 according to embodiments of the present invention is shown therein. The cable enclosure assembly 100 includes a first housing part 110 (referred to herein as the "top housing part"), a second housing part 130 (referred to herein as the "bottom housing part"), a strain relief member 160, two masses of flowable cable sealant 50 and flowable perimeter sealant 56. The assembly 100 includes a hinge mechanism 102 (FIG. 2) so that the housing parts 110, 130 are relatively pivotable between an open position as shown in FIG. 1 and a closed position as shown in FIG. 2. In the closed position, the assembly 100 defines a chamber 106 (FIG. 1). The assembly 100 may be referred to as a clamshell cable enclosure. Cable ports 104 (FIG. 2) communicate with the chamber 106 and the exterior of the assembly 100. The assembly 100 may be used with cables 20 to form a splice connection assembly 5 (FIGS. 1 and 2), for example.

Figure 5:
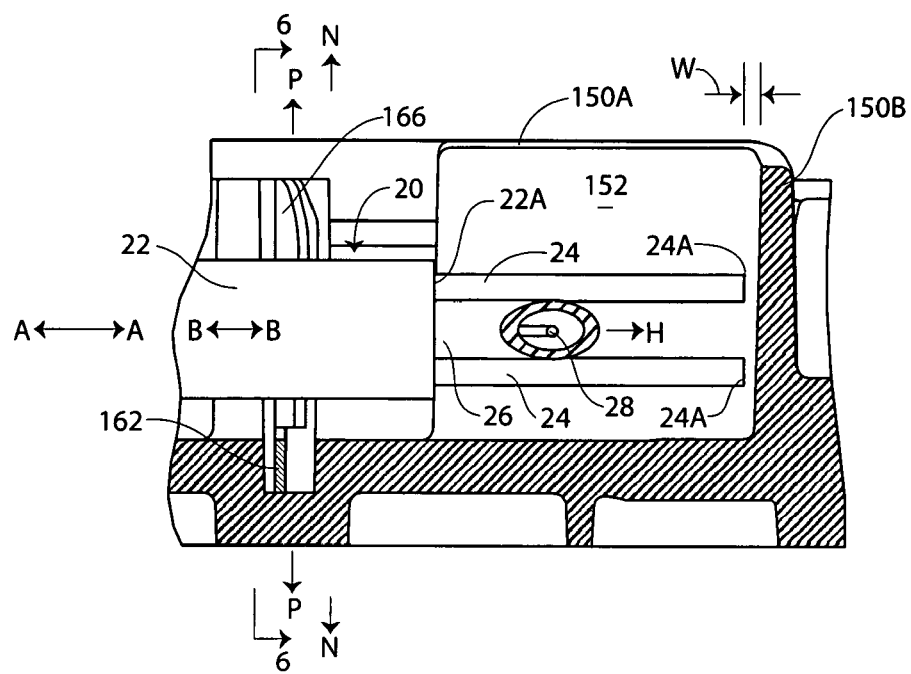
FIG. 5 is an enlarged, fragmentary, cross-sectional view of the cable enclosure assembly of FIG. 1 taken along the line 5-5 of FIG. 4, wherein the sealant is omitted for the purpose of explanation.

As illustrated and with reference to FIG. 5, the cables 20 are each optical fiber flat drop cables including an optical fiber 28, an inner jacket or buffer tube 26 surrounding the optical fiber 28, a pair of strength members 24, and an outer jacket 22 surrounding the components 24, 26, 28. The jacket 22 and the buffer tube 26 may be formed of any suitable material, such as a polymeric material. The jacket 22 may be extruded over the strength members 24 and the buffer tube 26. According to some embodiments, the jacket 22 tightly covers and conforms to the strength members 24 and the buffer tube 26. The optical fiber 28 may be loosely contained in the buffer tube 26. A gel or other sealant may be placed in the buffer tube 26. The strength members 24 may be formed of any suitable material, including a relatively stiff, hard material. Suitable materials for the strength members may include steel or fiberglass. The optical fiber 28 may be formed of glass, for example. While a single optical fiber 28 is shown in each cable 20, one or both of the cables 20 may include multiple optical fibers (e.g., twelve each) bundled in a common buffer tube 26, for example. Each cable 20 has a longitudinal or lengthwise cable axis A-A (FIG. 5), a cross-sectional width dimension D (FIG. 6), and a cross-sectional height dimension C (FIG. 6) that is greater than the width dimension D.

With reference to FIGS. 1 and 2, the top housing part 110 includes a body 112, hinge structures 114, latch structures 115, a perimeter sealing flange 116, locator structures 118, 119, and a compression feature or projection 120.

The bottom housing part 130 includes a body 132, hinge structures 134 (FIG. 2), latch structures 135, a perimeter sealant channel 136 (FIG. 3), a pair of containment wall structures 140 (FIGS. 3, 4 and 8), and a pair of strength member pocket wall structures 150 (FIGS. 3-5, 7 and 8). The hinge structures 134 mate with the hinge structures 114 to form the hinge mechanism 102 (FIG. 2). The latch structures 135 mate with the latch structures 115 to lock the assembly 100 in the closed position (FIG. 2). The perimeter sealant 56 is disposed in the perimeter channel 136.

Figure 4:
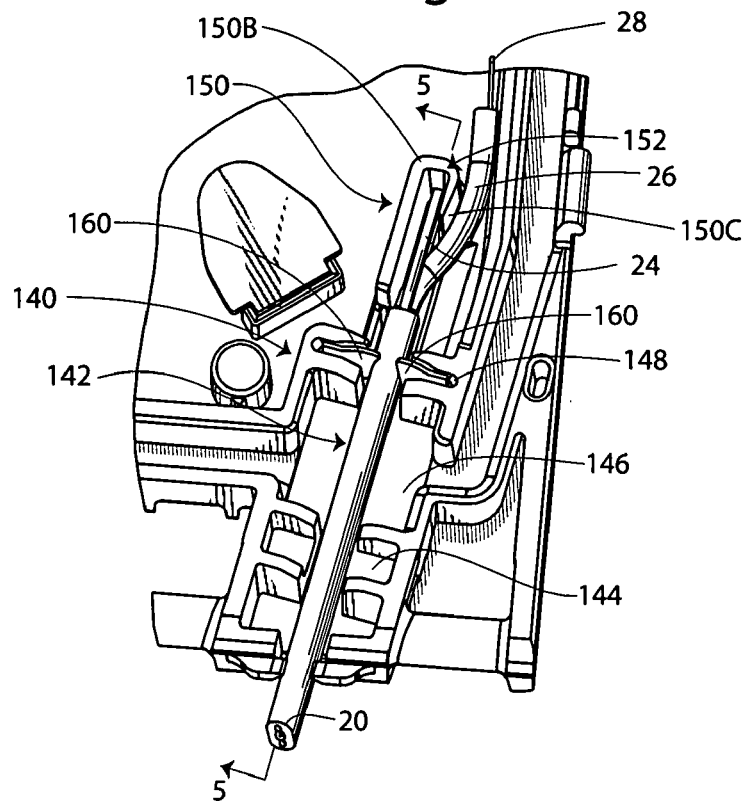
FIG. 4 is an enlarged, fragmentary, perspective view of the cable enclosure assembly of FIG. 1 with a cable mounted therein, wherein a sealant forming a part of the cable enclosure assembly is omitted for the purpose of explanation.

With reference to FIG. 4, each wall structure 140 defines a cable passage 142 communicating with a respective one of the cable ports 104 (FIG. 2). The wall structure 140 further defines a rear slot 144, a sealant cavity 146 and a strain relief member holding slot 148. A mass of cable sealant 50 (FIG. 8) is disposed in each sealant cavity 146.

With reference to FIGS. 4 and 5, each strength member pocket wall structure 150 includes an inner wall 150A, an end wall 150B, and an outer wall 150C collectively defining a strength member pocket or cavity 152 (FIG. 7) and a sideward opening 154 (FIG. 7) communicating with the strength member pocket 152.

The housing parts 110, 130 may each be formed of any suitable material. According to some embodiments, the housing parts 110, 130 are formed of a polymeric material. Suitable polymeric materials may include, polypropylene and its derivatives, or polycarbonate, for example.

Figure 6:
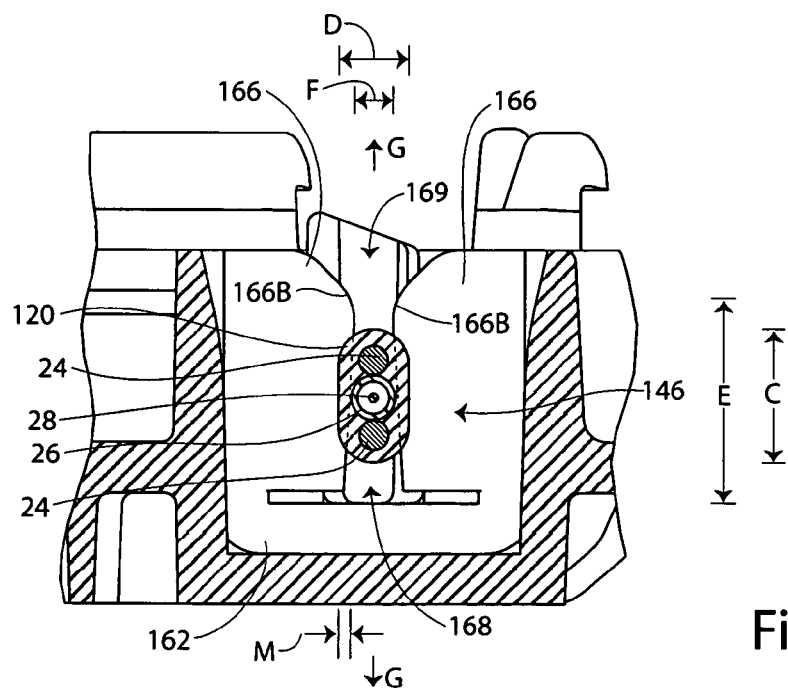
FIG. 6 is an enlarged, fragmentary, cross-sectional view of the cable enclosure assembly of FIG. 1 taken along the line 6-6 of FIG. 5, wherein the sealant is omitted for the purpose of explanation.
Figure 7:
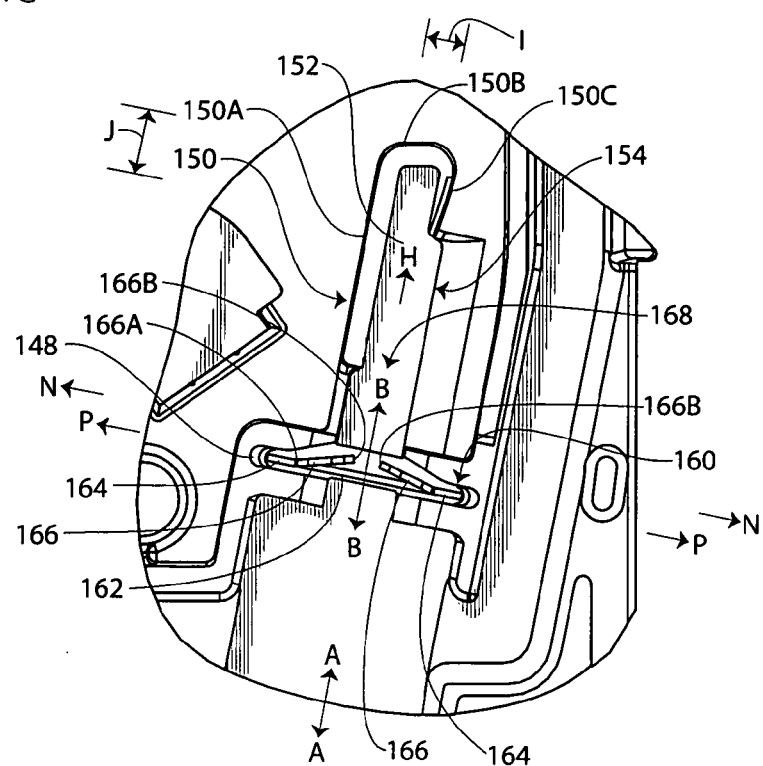
FIG. 7 is an enlarged, fragmentary, top plan view of the cable enclosure assembly of FIG. 1 prior to installation of the cable and wherein the sealant thereof is omitted for the purpose of explanation.
Figure 8:
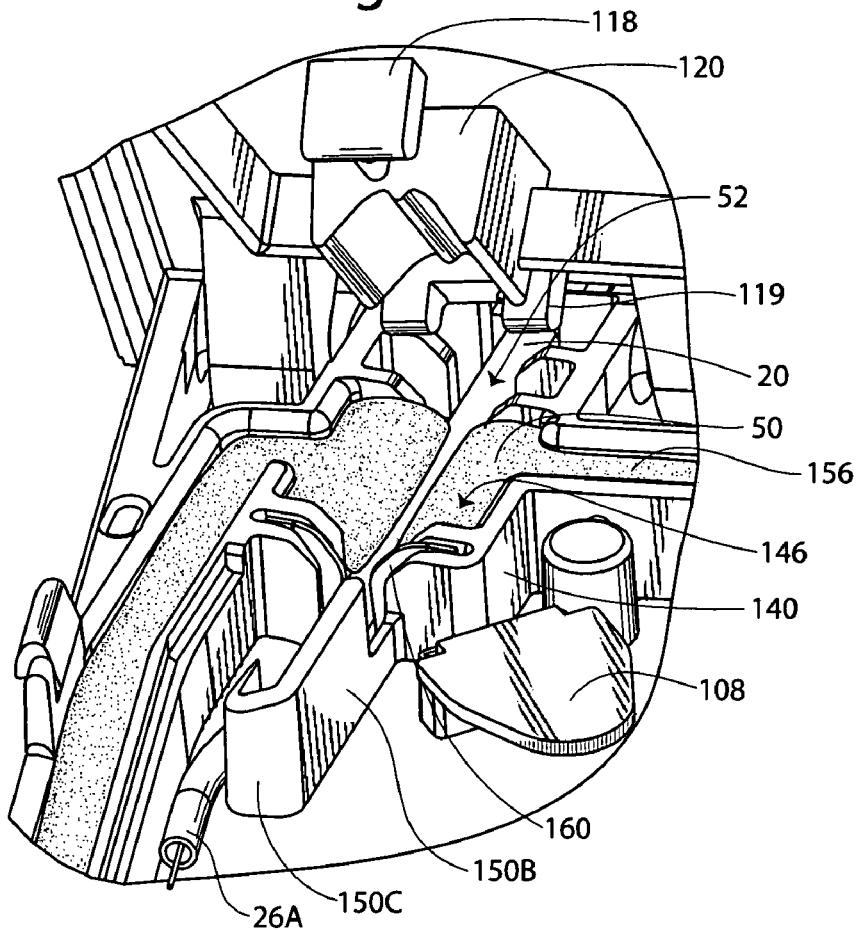
FIG. 8 is an enlarged, fragmentary, rear perspective view of the cable enclosure assembly of FIG. 1 wherein the cable is installed in the bottom housing part and a top housing part of the cable enclosure assembly has not yet been moved to the closed position.

With reference to FIGS. 6 and 7, the strain relief member 160 includes a base strip 162, a pair of upstanding opposed side posts 164, and a pair of opposed engagement tabs 166. Each engagement tab 166 has a fixed end 166A adjoining a respective one of the posts 164 so that the engagement tab 166 is flexibly cantilevered from the post 164. Each engagement tab 166 also has a knife edge 166B opposite its fixed end 166A. The knife edges 166B and the base strip 162 together to find a general U-shaped cable slot 168 therebetween and a top opening 169 communicating with the top end of the cable slot 168. The strain relief member 160 is securely mounted in the slot 148 of the bottom housing part 130. According to some embodiments, the base strip 162 and the side posts 164 are press fit into the slot 148. The slot 148 is shaped to permit the blade tabs 166 to deflect inwardly (i.e., away from the cable port 104) up to a prescribed deflection distance.

The cable slot 168 defines a passthrough axis B-B (FIG. 7) extending lengthwise through the cable slot 168. The knife edges 166B also define a blade axis G-G (FIG. 6) transverse (according to some embodiments and as shown, perpendicular) to the passthrough axis B-B. The fixed ends 166A define a primary strain relief member plane P-P (FIGS. 5 and 7) and the blade tabs 166 are angled out of the plane P-P and taper radially inwardly with respect to the pass through axis B-B in a direction away from the port 104. According to some embodiments, a slot plane N-N (FIGS. 5 and 7) defined by the blade edges 166B is substantially orthogonal to the passthrough axis B-B.

According to some embodiments, the blade tabs 166 are each disposed at an angle of between about 10 and 20 degrees with respect to the plane P-P.

The cable slot 168 has a nominal width F and a height E (FIG. 6). According to some embodiments, the width F is less than the nominal outer diameter D of the smallest cable 20 intended for use with the assembly 100. According to some embodiments, the width F is at least 0.6 inch less than the nominal outer diameter of the smallest cable 20 intended for use with the assembly 100.

Figure 9:
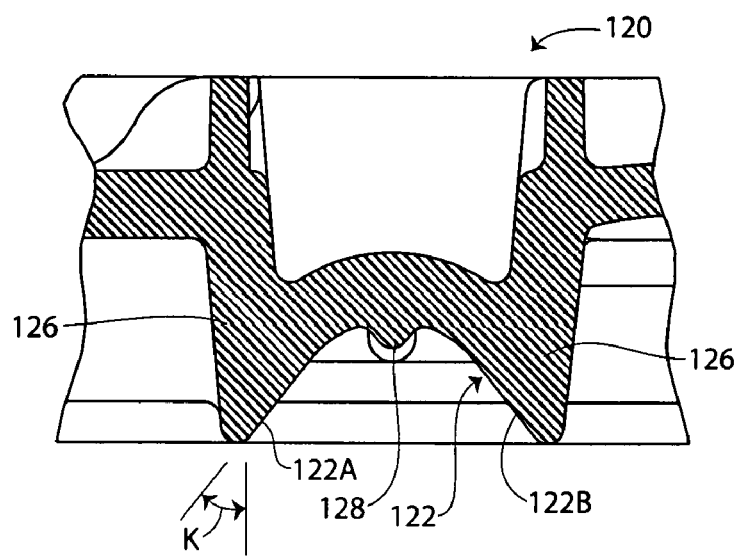
FIG. 9 is an enlarged, fragmentary, cross-sectional view of a compression feature of the cable enclosure assembly of FIG. 1.

The compression feature 120 (FIG. 9) may be integrally molded with the body 112 of the top housing part 110. The compression feature 120 includes an inner engagement surface 122 having opposed side surfaces 122A, 122B. According to some embodiments and as shown, the surface 122 is generally arcuate and concave (according to some embodiments, generally cup-shaped) in cross-section so that the channel defined thereby is truncated cylindrical (e.g., semicylindrical) overall. According to some embodiments, each side surface 122A, 122B forms an angle K (FIG. 9) of between about 25 and 45 degrees with respect to the blade axis G-G. The compression feature 120 may define opposed prongs 126 extending toward the sealant cavity 146 when the assembly 100 is closed.

A triple point filler feature 128 extends downwardly from the engagement surface 122. The triple point filler feature 128 may take the form of a lengthwise extending ridge. According to some embodiments, the triple point filler feature 128 is generally arcuate and convex in cross-section so that it is truncated cylindrical (e.g., semi-cylindrical) overall.

A plurality of clips 108 may be mounted in the bottom housing part 130 and used to manage the optical fibers 28 as discussed below. One or more splice holders 109 may be mounted in the bottom housing part 130 and used to hold one or more splices as discussed below.

The sealants 50, 56 may be any suitable sealants. According to some embodiments, the sealant 50 is a gel sealant. According to some embodiments, the sealant 56 is a gel sealant. According to some embodiments, both of the sealants 50, 56 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgarde® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aromatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd. through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm/sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd., XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram. Suitable gel materials include POWERGEL sealant gel available from Tyco Electronics Energy Division of Fuquay-Varina, NC under the RAYCHEM brand.

While, in accordance with some embodiments, the sealants 50, 56 are gels as described above, other types of sealants may be employed. For example, the sealants 50, 56 may be silicone grease or hydrocarbon-based grease.

According to some embodiments, the sealants 50, 56 are initially provided only in the bottom housing part 130. For example, the assembly 100 as manufactured may include sealant only in the bottom housing part 130 with the top housing part 110 being free of sealant.

The assembly 100 may be used in the following manner to form a splice connection assembly 5, for example. Each cable 20 is prepared. More particularly, the outer jacket 22, the strength members 24, the buffer tube 26 and the optical fiber 29 are trimmed to provide an outer jacket terminal end 22A, respective strength member terminal ends 24A extending beyond the jacket terminal end 22A, and a buffer tube terminal end 26A extending beyond the strength member terminal ends 24A, with the optical fiber 28 extending beyond the buffer tube terminal end 26A.

Each of the cables 20 is aligned with one of the cable passages 142 and its associated cable port 104. The cable 20 is then pressed downwardly so that the jacket 22 slides into the passage 142, the cable slot 168 of the strain relief member 160, and the cable sealant 50.

In the foregoing manner, the cable 20 displaces the cable sealant 50 so that the portion of the cable 20 in the sealant cavity 146 becomes at least partially surrounded by the cable sealant 50. The cable 20 may form a sealant void or trough 52 in the cable sealant 50.

The cable enters the cable slot 168 through the top opening 169. The relative shapes of the cable 20 and the slot 168 ensure that the cable 20 slides into the cable slot 168 along the blade axis G-G and is properly oriented during insertion and once seated. Depending on the size of the cable 20, the blade tabs 166 may deflect or flare inwardly (i.e., away from the port 104) to expand to accommodate the cable width D. According to some embodiments, once the cable 20 is installed, the cable axis A-A extends substantially orthogonal to the slot plane N-N.

The knife edges 166B of the blade tabs 166 cut radially into the outer jacket 22 of the cable 20 a distance M (FIG. 6). According to some embodiments, the cut depth M is at least about 0.005 inch. According to some embodiments, the cut depth M is between about 0.005 and 0.025 inch. According to some embodiments, the knife edges 166B cut into the outer jacket 22 but do not cut into the buffer tube 26. According to some embodiments, the alignment of the strength members 24 along the blade axis G-G ensures that, in the event the knife edges 166B cut more deeply through the outer jacket 22 (for example, as a result of vibration or tensioning of the cable 20), the knife edges 166B will engage the strength members 24 before engaging the buffer tube 26, thereby inhibiting or preventing the knife edges 166B from cutting through the buffer tube 26.

The strength member 24 is routed or laid into the strength member pocket 152 such that the strength member terminal ends 24A are positioned adjacent the end wall 150B as shown in FIGS. 4 and 5. According to some embodiments, the gap defined between the terminal ends 24A and the end wall 150B is in the range of from about zero to 0.15 inch.

Figure 3:
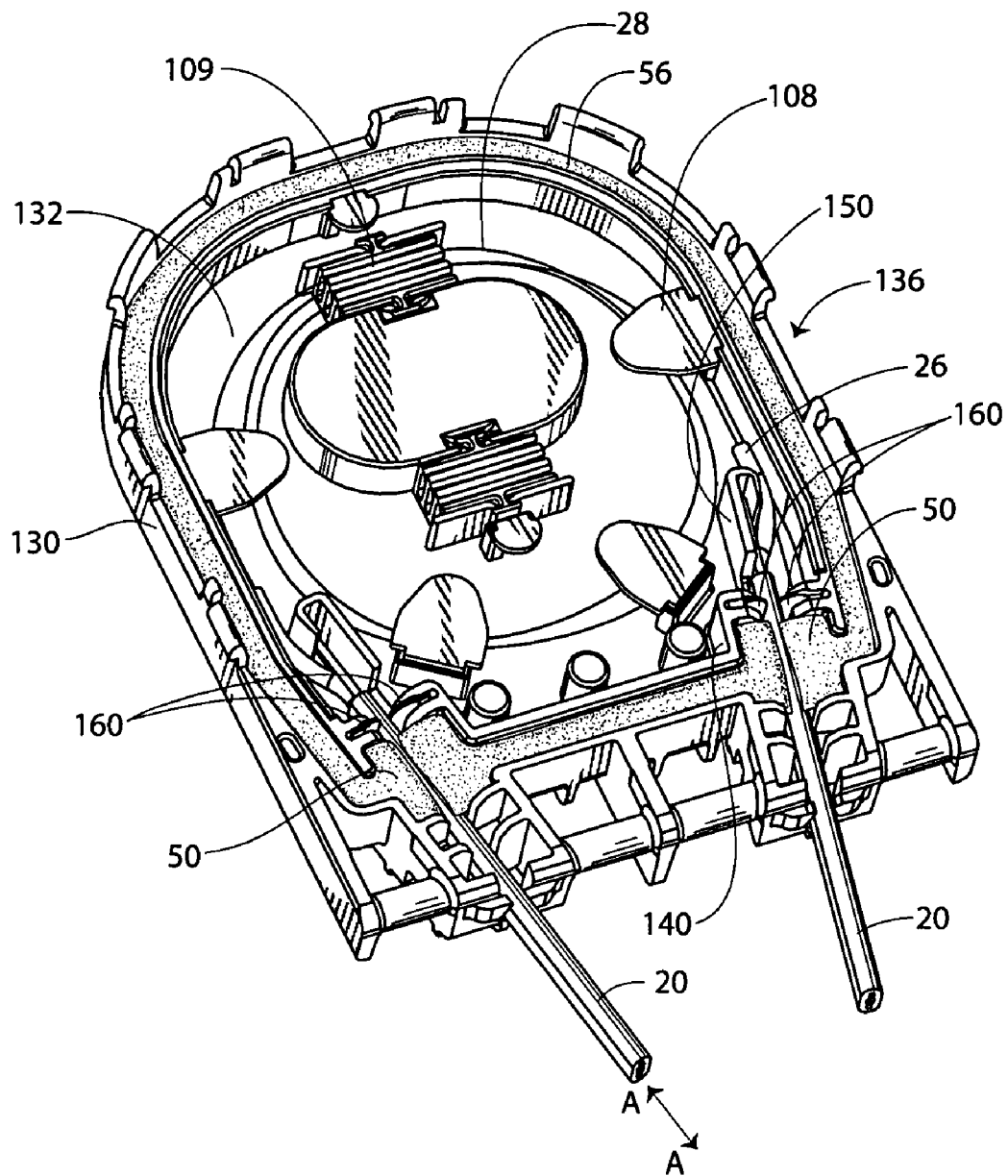
FIG. 3 is a perspective view of a bottom housing part of the cable enclosure assembly of FIG. 1 with cables mounted therein.

The buffer tube 26 is routed out of the cable passage 142 through the side opening 154, around the wall structure 140, and into the main chamber 106 of the bottom housing part 130 as shown in FIGS. 3 and 4. As shown in FIG. 3, the optical fiber 28 may be wound about the chamber 106 and retained by the clips 108 and ultimately spliced (e.g., by splice fusing) to the fiber 28 of the other cable 20. The splice may be mounted in the splice holder 109.

With the cable 20 mounted in the bottom housing part 130, the top housing part 110 is then mounted on the bottom housing part 130. The hinge structures 114 are interlocked with the hinge structures 134 to form the hinge mechanism 102 as shown in FIG. 1. According to some embodiments, the housing parts 110, 130 may be pre-coupled by the hinge mechanism 102 or another suitable releasable or permanent hinge mechanism.

The housing parts 110, 130 are pivoted with respect to one another about the hinge mechanism 102 to close the assembly 100 until the latch structures 115, 135 interlock to secure the assembly in its closed position.

The closure of the assembly 100 also effectuates a perimeter environmental seal and environmental seals about each of the cables 20. The perimeter seal is created by the sealant channel 136, the perimeter sealant 56 and the perimeter flange 116. As the housing parts 110, 130 are closed, the flange 116 enters the channel 136 and displaces the sealant 56. This perimeter seal may be maintained so long as the latch structures 115, 136 remain interlocked.

Each cable seal is provided by the respective cable sealant 50, wall structure 140, and compression feature 120. Typically, lateral insertion of the cable 20 into the cable sealant 50 will result in unreliable, incomplete or inadequate coverage of the cable 20 with sealant. As discussed above, insertion of the cable 20 into the cable sealant 50 may form a sealant trough 52. The compression feature 120 serves to displace the cable sealant 50 in a manner that ensures proper ultimate positioning of the cable sealant 50.

Figure 10A:
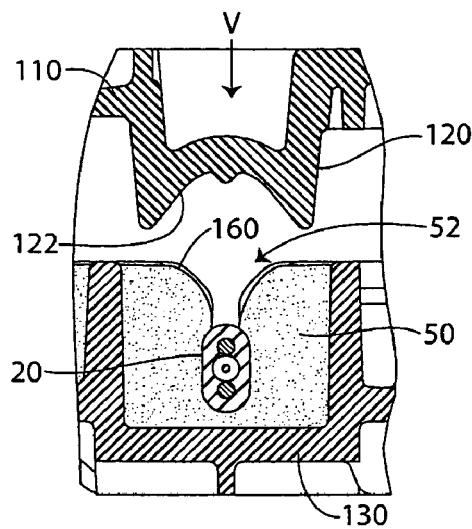
FIGS. 10A, 10B and 10C are enlarged, fragmentary, cross-sectional views of the cable enclosure assembly of FIG. 1 with the compression feature of the cable enclosure assembly is in various positions.
Figure 10B:
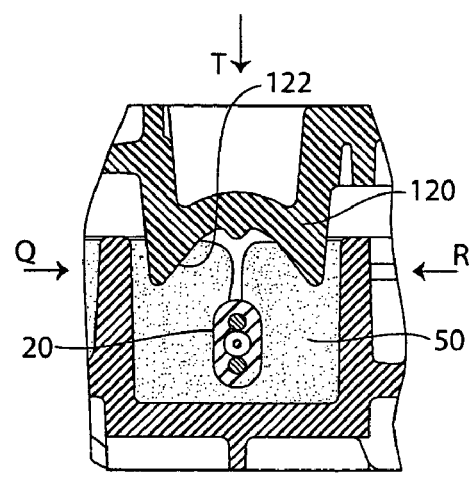
Figure 10C:
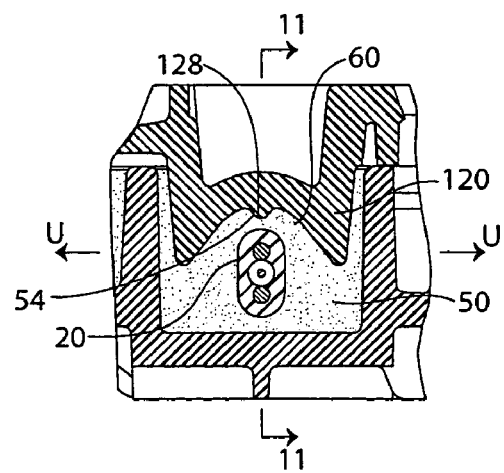
Figure 11:
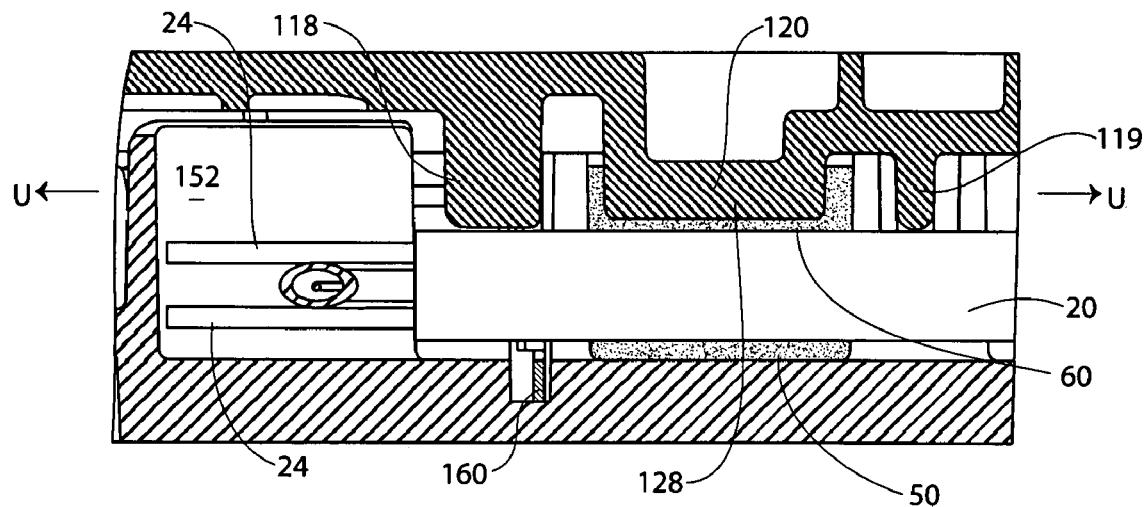
FIG. 11 is an enlarged, fragmentary, cross-sectional view of the splice connection assembly of FIG. 1 taken along the line 11-11 of FIG. 10C.

FIGS. 10A-10C and 11 show a closure sequence of the assembly 100. To form the cable seal, the compression feature 120 is moved in an installation direction V (FIG. 10A) toward the sealant cavity 146. In FIG. 10A, the cable 20 is installed in the strain relief member 160 and the top housing part 110 is still spaced apart from the bottom housing part 130 in a ready position such that the compression member 120 does not yet engage the cable sealant 50. In FIG. 10B, the top housing part 110 is partially closed onto the bottom housing part 130. The cable sealant 50 is partially displaced by the compression feature 120. In FIGS. 10C and 11, the assembly 100 is fully closed and the cable sealant 50 is fully displaced by the compression member 120, which is in an installed position. The compression member 120 is seated in the sealant cavity 146.

The compression member 120 (and, more particularly, the engagement surfaces 122A, 122B (FIG. 9)) is shaped such that it forces the cable sealant 50 to flow about the cable 20 in opposed inward directions Q and R (FIG. 10B) transverse (e.g., perpendicular) or generally radial to the cable axis A-A (FIG. 3) and transverse to the installation direction V to circumferentially surround the portion of the cable 20 in the sealant cavity 146. The engagement surfaces 122A, 122B apply a compressive load to the cable sealant 50 in each of the sideward directions Q, R and a downward direction T (FIG. 10B) substantially parallel to the installation direction V, transverse (e.g., perpendicular) to the cable axis A-A and substantially perpendicular to the plane U (FIGS. 10C and 11) defined between the housing parts 110, 130 when the assembly 100 is closed.

As discussed above, a sealant trough 52 may initially be present in the cable sealant 50. The compression member 120 may be configured to force the cable sealant 50 to flow about the cable 20 to fill the trough 52 with sealant 50 when the compression member 120 is moved into the closed position.

According to some embodiments, when the assembly 100 is closed, a buffer region 60 (FIG. 10C) is defined between the cable 20 and the compression feature 120. The compression feature 120 forces the cable sealant 50 to flow into and fill, at least in part, the buffer region 60. As best seen in FIG. 11, the locator features 118, 119 serve to ensure that the cable 20 is properly spaced apart from the compression member 120 to maintain the buffer region 60. The locator features 118, 119 also serve to properly position the cable 20 in the cable slot 168 of the strain relief member 160.

Figure 12:
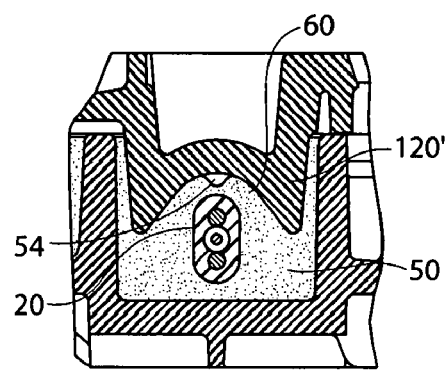
FIG. 12 is an enlarged, fragmentary, cross-sectional view of an alternative embodiment of the cable enclosure assembly wherein a triple point filler feature is not provided.

The triple point filler feature 128 may serve to fill a triple point channel 54 in the cable sealant 50 when the assembly 100 is closed. For the purpose of explanation, an alternative embodiment is shown in FIG. 12 wherein a compression feature 120' having no triple point filler feature 128 is provided. When sealants such as gels, mastics and viscous materials are compressed around an object, they may meet at a triple point 54. A triple point is an intersection of three sealing surfaces where a roughly triangular leak path is created. Typically, this leak path should be sealed off. In many cases, extraordinarily high pressures must be applied to the sealant in order to reduce this triangular leak path to zero and create a perfect or satisfactory seal. As the triangular space becomes smaller and smaller, more and more pressure is required to eliminate the space or leak path.

Referring again to FIG. 10C, the triple point filler feature 128 fills the triple point channel 54 so that it is not necessary to eliminate the triple point channel 54 by further displacing the sealant 50. In this manner, the triple point filler feature 128 may greatly reduce the amount of compression required to force the cable sealant 50 to completely seal about the portion of the cable 20 without permitting remaining leak paths.

The strain relief member 160 and the protrusion pocket wall structure 150 may reliably and satisfactorily secure each cable 20 in the assembly 100 without requiring the use of bolts, clamps, or the like to secure the strength members 24. The cable 20 is strain relieved and pull out is limited or prevented by the strain relief member 160. The blade tabs 166 may function like barbs and grip the cable 20 more tightly when the cable 20 is pulled away from the assembly 100, thereby tenaciously preventing axial withdrawal of the cable 20 from the assembly 100. The strain relief member 160 and the pocket wall structure 150 may separate the functions of limiting or resisting withdrawal of the cable 20 from the assembly 100 and limiting or resisting insertion or protrusion of the cable into the assembly 100.

As illustrated, the slot 168 of the strain relief member 160 may have a width F that is much less than the width D of the cable 20 so that the cable 20 can only be inserted into the slot 168 in one orientation, namely, such that its height dimension C (i.e., the greater cross-sectional dimension) is parallel to or substantially coincident with the slot depthwise axis or blade axis G-G. This may ensure that the symmetrical axis G-G of the slot 168 passes through the center of each strength member 24 and the buffer tube 26 containing the fiber 28. As discussed above, this configuration may ensure that the knife edges 166B contact the strength members 24 before contacting the buffer tube 26, thereby preventing damage to the fiber 28 itself.

The strength member pocket wall structure 150 may serve to limit or prevent axial sliding of the cable 20 or the strength members 24 into the enclosure 100. In the event the cable 20 is forced into the enclosure 100, the terminal ends 24A of the strength member 24 will abut the end wall 150B to resist cable intrusion that may damage the fiber 28. Strength member protrusion is a known phenomenon wherein cable strength members extend and retract in length as a result of thermal expansion and contraction. The pocket wall structure 150 defines the strength member pocket 152 within which the strength members 24 will be contained in the event the strength members protrude inwardly (i.e., generally in an intrusion direction H (FIG. 7)), thereby preventing the strength members 24 from progressing further inwardly and damaging the fiber 28. According to some embodiments, the width I and the contained depth J (FIG. 7) of the pocket 152 are selected to be sufficiently narrow and short that the strength members 24 cannot buckle under columnar loading in the even the strength members 24 protrude in and bottom out in the pocket 152. According to some embodiments, the strength members 24 are trimmed and installed in the pocket 152 such that the initial spacing W (FIG. 5) between the terminal ends 24A of the strength members 24 and the wall 150B is in the range of from about zero to 0.15 inch. The side opening 154 (FIG. 7) is sized and positioned to allow the buffer tube 26 to pass around the wall structure 150 without excessively bending the fiber 28 in the buffer tube 26.

The cable sealing system according to embodiments of the present invention can provide an effective, reliable and convenient environmental seal about a cable. The cable sealing system may be particularly well-suited for small diameter fiber optic cables (e.g., from about 0.1 to 0.3 inch in diameter). In particular, the sealing system may be employed with flat drop fiber optic cables having an approximately oval cross-section. The cable sealing system may allow the use of a two-piece or two-sided housing assembly having sealant in only one piece or side of the housing assembly.

The piston (i.e., compression feature 120) and bore (i.e., cable sealant cavity 146 defined by the wall structure 140) configuration of the cable sealing system may enable relatively high compression loading of the sealant 50 while also limiting egress of the sealant 50 from the sealant cavity 146 or the assembly 100. When, as illustrated, the compression feature 120 is located adjacent the hinge mechanism 102 and distal from the opposed, free ends of the housing parts 110, 130, the assembly may provide improved mechanical leverage advantage so that substantial compression loading can be imparted to the sealant 50 by manually closing the assembly 100.

The assembly 100 may provide a reliable (and, in at least some embodiments, moisture-tight) seal between the assembly 100 and the cables 20. The sealant 50 may accommodate cables of different sizes within a prescribed range.

When the sealant 50 is a gel, the compression feature 120 applies a compressive force to the sealant 50. The gel is thereby elongated and is generally deformed and substantially conforms to the outer surface of the cable 20 and to the inner surfaces of the assembly 100. Some shearing of the gel may occur as well. Preferably, at least some of the gel deformation is elastic. The restoring force in the gel resulting from this elastic deformation causes the gel to operate as a spring exerting an outward force between the assembly 100 and the cable 20.

Various properties of the gel, as described above, may ensure that the gel sealant 50 maintains a reliable and long lasting hermetic seal between the assembly 100 and the cable 20. The elastic memory and the retained or restoring force in the elongated, elastically deformed gel generally cause the gel to bear against the mating surfaces of the cable 20 and the assembly 100. Also, the tack of the gel may provide adhesion between the gel and these surfaces. The gel, even though it is cold-applied, is generally able to flow about the cable 20 and the limiter module 100 to accommodate their irregular geometries. According to some embodiments, each sealant 50, 56 is a self-healing or self-amalgamating gel.

While cables 20 having optical fibers 28 as transmission media have been disclosed herein, according to further embodiments, cables having other types of transmission media (e.g., electrical conductors formed of copper or other metal) may be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A cable sealing assembly for providing an environmental seal about a cable, the assembly comprising:
   a housing including first and second housing parts, the first housing part defining a cable passage to receive a cable having a lengthwise cable axis;
   a flowable cable sealant disposed in the cable passage; and
   a compression feature forming at least a part of the second housing part and movable in an installation direction between a ready position and an installed position;
   wherein the compression feature is shaped and configured to force the cable sealant to flow about the cable in a direction transverse to the cable axis to circumferentially surround a portion of the cable when the compression feature is moved from the ready position to the installed position; and wherein the compression feature, when moved from the ready position to the installed position in the installation direction, applies a compressive load to the cable sealant in each of:
a first direction generally toward the cable, substantially parallel to the installation direction and substantially perpendicular to the cable axis;
a second direction generally toward the cable, transverse to the cable axis and transverse to the first direction; and
a third direction generally toward the cable, transverse to the cable axis, transverse to the first direction, and generally opposing the second direction.

2. The assembly of claim 1 wherein the compression feature has a generally concave engagement surface.

3. The assembly of claim 1 wherein:
the assembly is configured to initially receive the cable in the cable passage such that a cable entry trough is defined in the cable sealant along the portion of the cable; and
the compression feature is shaped and configured to force the cable sealant to flow about the cable to fill the cable entry trough with the cable sealant when the compression feature is moved from the ready position to the installed position.

4. The assembly of claim 1 wherein:
when the compression feature is in the installed position, a buffer region is defined between the compression feature and the cable; and
the compression feature is shaped and configured to force the cable sealant to flow about the cable to fill the buffer region with the cable sealant when the compression feature is moved from the ready position to the installed position.

5. The assembly of claim 4 wherein the second housing part includes a locator feature configured to engage the cable to maintain a buffer spacing distance between the cable and the compression member to maintain the buffer region.

6. The assembly of claim 1 wherein the assembly is a cable enclosure assembly, the first and second housing parts are relatively movable between an open position and a closed position, and the cable enclosure assembly defines an enclosed chamber when the cable enclosure assembly is in its closed position.

7. The assembly of claim 6 wherein the cable enclosure assembly is a clamshell assembly and the first and second housing parts are pivotally joined by a hinge mechanism.

8. The assembly of claim 7 wherein the hinge is located on a hinge side of the cable enclosure assembly, the assembly includes a cable port communicating with the cable passage to receive the cable, the cable port is defined in the hinge side of the cable enclosure assembly, and the cable sealant and the compression feature are located adjacent the cable port.

9. The assembly of claim 6 including a perimeter sealant, wherein the cable sealant and the perimeter sealant in combination environmentally seal the chamber when the cable enclosure assembly is in its closed position.

10. The assembly of claim 6 wherein the second housing part is free of sealant when the cable enclosure assembly is in its open position.

11. The assembly of claim 1 wherein the first housing part includes at least one containment wall defining a sealant cavity in the cable passage, wherein the cable sealant is bounded by the at least one containment wall to limit displacement of the cable sealant from the sealant cavity when the compression feature is moved from its ready position to its installed position.

12. The assembly of claim 1 including the cable installed in the cable passage, wherein the cable is a fiber optic cable including an optical fiber.

13. The assembly of claim 12 wherein the cable is a flat drop cable including a strength member, an optical fiber, and a jacket surrounding the strength member and the optical fiber.

14. The assembly of claim 12 including:
a second cable, wherein the second cable is a fiber optic cable including an optical fiber; and
a splice connection coupling the optical fibers of the first and second cables in chamber defined by the first and second housing parts.

15. The assembly of claim 1 including a triple point filler feature configured to occupy a triple point void channel formed in the cable sealant by movement of the compression feature from the ready position to the installed position.

16. The assembly of claim 15 wherein the triple point filler feature is located on the compression feature.

17. The assembly of claim 1 wherein the sealant is an elastically elongatable gel sealant.

18. A method for providing an environmental seal about a cable having a lengthwise cable axis using a cable sealing assembly including first and second housing parts, the method comprising:
installing the cable in a cable passage defined in the first housing part; and thereafter
moving a compression feature forming at least a part of the second housing part in an installation direction between a ready position and an installed position such that the compression feature forces a flowable cable sealant disposed in the cable passage to flow about the cable in each of:
a first direction generally toward the cable, substantially parallel to the installation direction and substantially perpendicular to the cable axis;
a second direction generally toward the cable, transverse to the cable axis and transverse to the first direction; and
a third direction generally toward the cable, transverse to the cable axis, transverse to the first direction, and generally opposing the second direction
to circumferentially surround a portion of the cable.

19. The method of claim 18 wherein the cable sealant is an elastically deformable gel sealant and including elastically elongating and deforming the gel sealant such that the gel sealant deforms to substantially conform to the portion of the cable and a restoring force in the elastically deformed gel sealant bears against the portion of the cable.

20. A cable sealing assembly for providing an environmental seal about a cable, the assembly comprising:
a housing assembly defining a cable passage to receive a cable having a lengthwise cable axis; and
a flowable cable sealant disposed in the cable passage;
wherein the housing assembly includes:
a compression feature movable between a ready position and an installed position to flowably displace the cable sealant about the cable; and
a triple point filler feature configured to occupy a triple point void channel formed in the cable sealant by movement of the compression feature from the ready position to the installed position.

21. A method for providing an environmental seal about a cable having a lengthwise cable axis using a cable sealing assembly, the method comprising:

installing the cable in a cable passage defined in the cable sealing assembly, the cable passage having a flowable cable sealant disposed therein; and thereafter moving a compression feature from a ready position to an installed position to flowably displace the cable sealant about the cable and position a triple point filler feature in a triple point void channel formed thereby in the cable sealant.

22. The method of claim 18 wherein:

installing the cable in the cable passage includes forming a cable entry trough in the cable sealant along the portion of the cable; and the compression feature is shaped and configured to force the cable sealant to flow about the cable to fill the cable entry trough with the cable sealant when the compression feature is moved from the ready position to the installed position.

23. The method of claim 18 wherein the compression feature has a generally concave engagement surface.

24. A cable sealing assembly for providing an environmental seal about a cable, the assembly comprising:

a housing including first and second housing parts, the first housing part defining a cable passage to receive a cable having a lengthwise cable axis;

a flowable cable sealant disposed in the cable passage; and a compression feature forming at least a part of the second housing part and movable in an installation direction between a ready position and an installed position;

wherein the compression feature is shaped and configured to force the cable sealant to flow about the cable in a direction transverse to the cable axis to circumferentially surround a portion of the cable when the compression feature is moved from the ready position to the installed position; and wherein the compression feature has a generally concave engagement surface.

25. A cable sealing assembly for providing an environmental seal about a cable, the assembly comprising:

a housing including first and second housing parts, the first housing part defining a cable passage to receive a cable having a lengthwise cable axis;

a flowable cable sealant disposed in the cable passage; and a compression feature forming at least a part of the second housing part and movable in an installation direction between a ready position and an installed position;

wherein the compression feature is shaped and configured to force the cable sealant to flow about the cable in a direction transverse to the cable axis to circumferentially surround a portion of the cable when the compression feature is moved from the ready position to the installed position;

wherein, when the compression feature is in the installed position, a buffer region is defined between the compression feature and the cable;

wherein the compression feature is shaped and configured to force the cable sealant to flow about the cable to fill the buffer region with the cable sealant when the compression feature is moved from the ready position to the installed position; and wherein the second housing part includes a locator feature that is configured to engage the cable to maintain a buffer spacing distance between the cable and the compression member to maintain the buffer region.

26. A cable sealing assembly for providing an environmental seal about a cable, the assembly comprising:

a housing including first and second housing parts, the first housing part defining a cable passage to receive a cable having a lengthwise cable axis;

a flowable cable sealant disposed in the cable passage; and a compression feature forming at least a part of the second housing part and movable in an installation direction between a ready position and an installed position;

wherein the compression feature is shaped and configured to force the cable sealant to flow about the cable in a direction transverse to the cable axis to circumferentially surround a portion of the cable when the compression feature is moved from the ready position to the installed position;

wherein the assembly is configured to initially receive the cable in the cable passage such that a cable entry trough is defined in the cable sealant along the portion of the cable; and wherein the compression feature is shaped and configured to force the cable sealant to flow about the cable to fill the cable entry trough with the cable sealant when the compression feature is moved from the ready position to the installed position.

27. A cable sealing assembly for providing an environmental seal about a cable, the assembly comprising:

a housing including first and second housing parts, the first housing part defining a cable passage to receive a cable having a lengthwise cable axis;

a flowable cable sealant disposed in the cable passage; and a compression feature forming at least a part of the second housing part and movable in an installation direction between a ready position and an installed position;

wherein the compression feature is shaped and configured to force the cable sealant to flow about the cable in a direction transverse to the cable axis to circumferentially surround a portion of the cable when the compression feature is moved from the ready position to the installed position; and wherein the cable sealing assembly further includes a triple point filler feature configured to occupy a triple point void channel formed in the cable sealant by movement of the compression feature from the ready position to the installed position.

* * * * *